United States Patent [19]

Akutsu et al.

[11] Patent Number: 4,835,552

[45] Date of Patent: May 30, 1989

[54] RECORDING HEAD

[75] Inventors: Eiichi Akutsu; Hiroo Soga; Hiroshi Saito; Koichi Saito; Kiyoshi Horie, all of Kanagawa, Japan

[73] Assignee: Fuji Xerox Co., Ltd., Tokyo, Japan

[21] Appl. No.: 219,970

[22] Filed: Jul. 14, 1988

[30] Foreign Application Priority Data

Jul. 16, 1987 [JP] Japan ................................ 62-176042

[51] Int. Cl.$^4$ ..................... G01D 15/16; G01D 15/06; G01D 15/10

[52] U.S. Cl. ................................ 346/139 C; 346/165; 346/76 PH

[58] Field of Search .................. 346/155, 165, 76 PH, 346/139 C; 219/216 PH

[56] References Cited

U.S. PATENT DOCUMENTS 3,673,593 6/1972 Kaye .............................. 346/139 C 4,679,054 7/1987 Yoshikawa ..................... 346/76 PH

*Primary Examiner*—E. A. Goldberg

*Assistant Examiner*—Scott Rogers

*Attorney, Agent, or Firm*—Finnegan, Henderson, Farabow, Garrett, & Dunner

[57] ABSTRACT

A recording head of the present invention comprises an electrically insulating substrate having an elastic layer on a substrate, a plurality of recording electrodes arranged in a side-by-side relationship on the elastic layer, and a groove provided between the adjacent recording electrodes at least in the area near the front end of the electrode.

5 Claims, 4 Drawing Sheets

RECORDING HEAD

BACKGROUND OF THE INVENTION

The present invention relates to a recording head with which electrical image signals can be applied to a recording medium.

A current impression process has been proposed as a recording technique in which electrical image signals are converted to thermal energy which melts an ink layer so that ink is transferred to a receiving sheet. One of the types of recording heads that are employed in this process is shown in FIG. 3; it is a unitary assembly of a plurality of recording electrodes 2 and larger pickup electrodes 9 (see, for example, Japanese Patent Application No. 171666/1984 (OPI); the term OPI as used herein means an unexamined published Japanese patent application). Another type of recording head is shown in FIG. 4; it comprises of a rigid plate 10 made of ceramic or some other suitable material and is overlaid with recording electrodes 2 in a patterned metal layer and an insulator film 11 (see, for example, Japanese Patent Application (OPI) No. 124265/1985).

The first type of recording head shown in FIG. 3 has both recording and pickup heads situated on the surface which is to be placed in contact with a recording medium. Because of the large area of contact with the recording medium, the total pressure to be exerted upon the head must be increased, and this often results in failure to achieve uniform compression. An additional problem is the need to increase the torque that is to be generated by drive rolls. These factors combine to potentially impair the reliability of the recording operation.

In recording an image with using the second type of head shown in FIG. 4, the surface of its edge must be brought into contact with the recording medium. If the head is inclined with respect to the medium, the area of contact between the two members is significantly decreased which renders the recording operation impossible in practical terms. To avoid this problem, the head must always be kept vertical relative to the recording medium by means of a high-precision head retaining mechanism.

SUMMARY OF THE INVENTION

It is accordingly an object of the present invention to provide a recording head that is free from the aforementioned problems of the conventional art and which ensures consistent contact with an ink medium under a small compressive force while experiencing a sufficiently reduced degree of friction with the ink medium, to guarantee extended service.

There is proposed a recording head having an elastic layer formed on an electrically insulating substrate as shown in Japanese Patent Application No. 47151/1988 (OPI) (not prior art). As a result of conducting studies on this type of head, the present inventors have found that by providing grooves in the elastic layer, a recording head capable of reliable recording operations at lower levels of compressive pressure could be produced. The present invention has been accomplished on the basis of this finding.

A recording head according to the present invention comprises an electrically insulating substrate having an elastic layer on a substrate and which is overlaid with a plurality of recording electrodes arranged in a side-by-side relationship. A groove is provided between adjacent recording electrodes at least in the area near the front end of the recording head. The groove may be formed at every portion between the electrodes adjacent to each other. Or, the groove may be formed only at the portion corresponding to the every few electrodes. Furthermore, the plurality of recording electrodes may be covered with an insulation coating except in part of the area near the front end of each electrode, with a projection made of an electroconductive material being formed in each of the areas of the recording electrodes that are not covered with the insulation coating.

BRIEF DESCRIPTION OF THE DRAWINGS

FIG. 3 shows the manner how the recording head of the present invention is used to print characters.

DETAILED DESCRIPTION OF THE INVENTION

The recording head of the present invention is used for recording an image by application of an electric current. To record an image by current application, the head is pressed against a recording medium having an ink layer which fuses upon heat generation and a plurality of recording electrodes on the head are placed in slidable contact with the recording medium. In response to electrical image signals supplied from the head, the heat-generating layer in the recording medium generates heat and the ink in the ink layer adjacent to the heat-generating layer is selectively fused and transferred to a receiving sheet to produce a record. According to the present invention, the substrate is provided with an elastic layer which is capable of deforming in conformity with any asperities or waviness that may exist on the surface of the recording medium against which the recording head is pressed. Furthermore, since grooves are provided in the elastic layer between adjacent recording electrodes, the recording electrodes will be pressed against the recording medium in such a way that one recording electrode is independent of the others. Such independency of adjacent electrodes offers the advantage that any separation that might occur between one electrode and the surface of the recording medium on account of dirt particles or some other foreign matter will not substantially affect other electrodes. This will be effective in ensuring that the recording electrodes on the head are kept in contact with the recording medium at all times of current application.

The above-described effect is, of course, obtained in the case where the grooves are formed at the portions between all the electrodes adjacent to each other, that is, in the case where the grooves are formed at the portions corresponding to all the electrodes. However, the effect is obtainable also in the case where the grooves are formed at the portions corresponding to only the every few electrodes.

Furthermore, in the case where the recording electrodes are covered with an insulating coating without selected areas and projections made of electroconductive material are formed in the selected areas, only the conductive projections will come into contact with the recording medium, thereby ensuring that good contact between the electrodes and the recording medium is consistently attained even if they are only compressed with a few degree of pressure.

The present invention is described in greater detail with reference to the embodiments shown in FIGS. 1 and 2.

Figure 1:
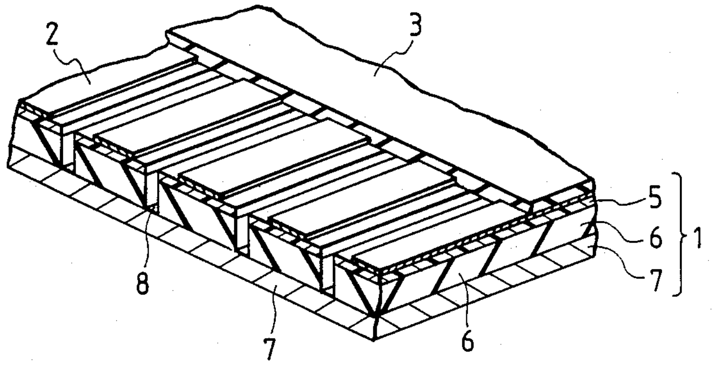
FIGS. 1 and 1A are perspective views of a recording head to the first embodiment of the present invention.
Figure 1A:
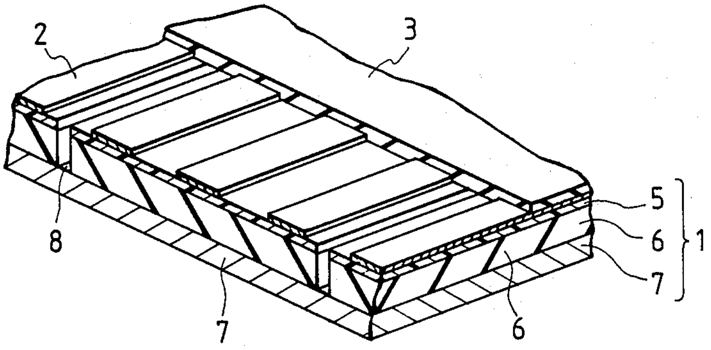

FIG. 1 is a perspective view of a recording head according to the first embodiment of the present invention. As shown, an elastic layer 6 is formed on a rigid substrate 7 and this is overlaid with an insulator film 5 so as to form an electrically insulating substrate 1. A plurality of recording electrodes 2 are disposed in a side-by-side relationship on this insulating substrate 1. Each of the recording electrodes 2 is covered with an insulator coating 3 except at their front ends. A groove 8 is formed between adjacent electrodes 2 in the area near the front end of each recording head.

Figure 2A:
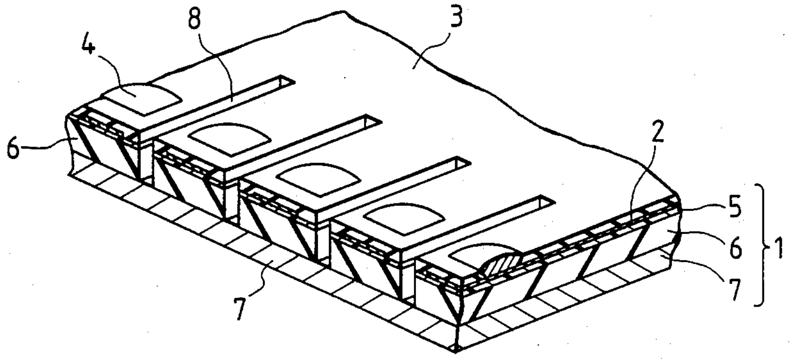
FIG. 2A is a perspective view of a recording head according to the second embodiment of the present invention.
Figure 2B:
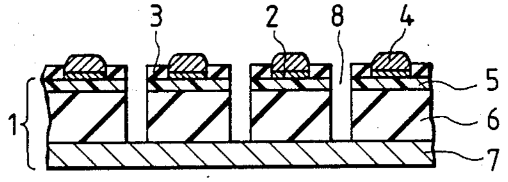
FIG. 2B is a transverse sectional view of the recording head shown in FIG. 2A.
Figure 2C:
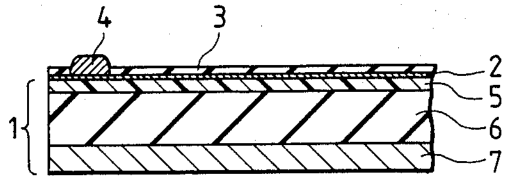
FIG. 2C is longitudinal sectional view of the recording head shown in 2A.
Figure 3:
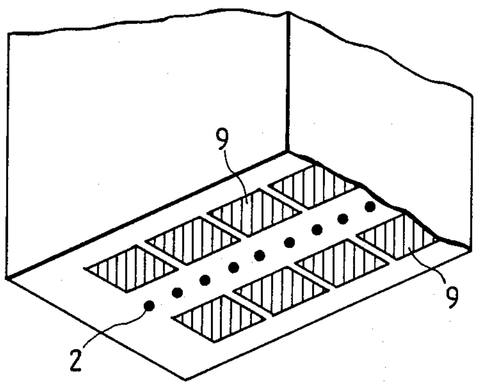
FIGS. 3 and 4 are perspective views of two types of conventional recording heads.
Figure 4:
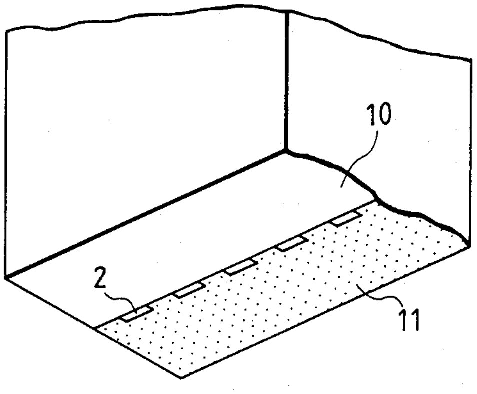

FIGS. 2A through 2C show a recording head according to the second embodiment of the present invention. FIGS. 2A, 2B and 2C are a perspective view, a transverse sectional view, and a longitudinal sectional view, respectively. The electrically insulating substrate 1 shown in FIG. 2 has the same structure as the electrically insulating substrate 1 shown in FIG. 1 and the recording electrodes 2 arranged in a side-by-side relationship on the substrate 1 are covered with an insulator coating 3 except in part of the area near the front end of each electrode. A projection 4 made of a electroconductive material is formed in each of the exposed areas of the recording electrodes 2 which are not covered with the insulator coating 3. A groove 8 is cut between adjacent electrodes 2 in the area near the front end of the recording head.

In the above-described embodiments shown in FIGS. 1 and 2A through 2C, the groove 8 is formed at the every portion between the electrodes 2, as a result of which the grooves 8 separate all the electrodes 2 from one another. However, the groove 8 may be formed only at the portions corresponding to the every few electrodes, as shown in FIG. lA, for example.

We will describe hereinafter the manner how the recording head of the present invention is used for recording characters. The description is given for the recording head of the second embodiment, for example.

Figure 5:
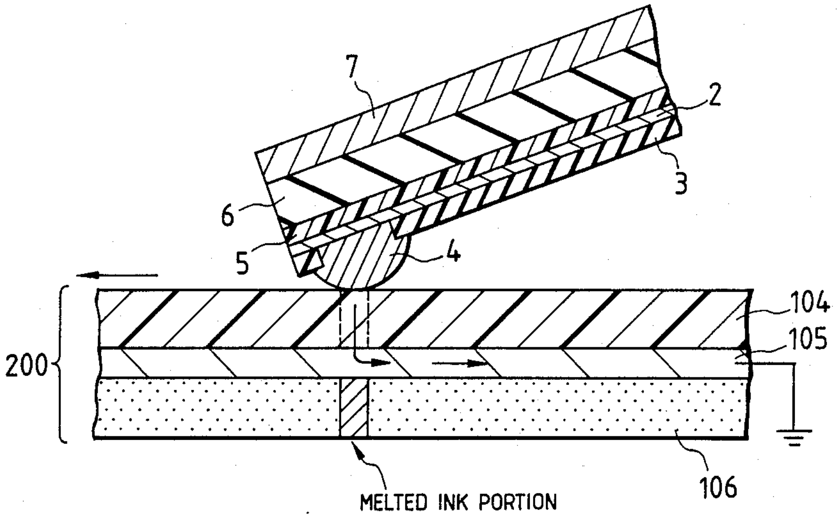

As shown in FIG. 5, the recording head is disposed on a heat-generating layer 104 of an ink ribbon (thermal ink transfer recording medium) 200, so as to form an angle of in a range of 15° to 50°, preferably in a range of 20°to 30° with respect to the surface of the ink ribbon. The contact pressure applied is in a range of 100 g/cm to 1000 g/cm, preferably in a range of 300 g/cm to 700 g/cm. As the ink ribbon to be used for the recording head of the present invention, it is sufficient that the ink ribbon has a heat-generating layer 104 which is formed of resin with electroconductive materials dispersed therein and generates heat with the current application, an electroconductive layer 105 acting as a pickup electrodes for the current, and an ink layer 106 which melts or sublimes with applied heat. The ink ribbon 200 may be further provided with an anisotropically conductive layer or an ink release layer. For example, the thermal ink-transfer medium described in the U.S. patent application Ser. No. 217,784, filed July 12, 1988 entitled "THERMAL INK-TRANSFER RECORDING MEDIUM" is preferable for the recording head of the present invention.

We will describe, hereinafter, how the elements of the first and the second embodiments are produced, in detail. As apparent from below, the elements 7, 6 and 5 (1), 2, 3 and 8 common to the first and the second embodiments are produced in the same way with each other.

According to the first and the second embodiments, the insulating substrate 1 comprises a rigid substrate 7 made of an insulating ceramic, a plastic, an insulation-coated metal or the like and is overlaid with an elastic layer 6 made of such a material as silicone rubber, urethane rubber, synthetic rubber, natural rubber, a porous material, a foamed material or the like. If desired, the elastic layer 6 may be further overlaid with an insulating film 5 made of such a material as polyimide, polyester or some other types of heat-resistant plastics. The insulating film 5 may be omitted.

A plurality of recording electrodes 2 are formed on the insulating substrate 1. For example, a suitable method of forming the electrodes 2 comprises: depositing a film of a conductive metal (which is, for example, selected from among Ni, Cr, Au, Cu, Ta, Ti, Fe, Al, Mo, W, Zn, Sn, Pt, Pb and alloys thereof) in a thickness of 0.2 to 50 um by a thin-film process such as vacuum evaporation, sputtering, electroless plating, electrolytic plating or the like; and patterning the deposited metal film in stripes by a combination of lithography using light or a laser beam and either the wet etching or the dry etching.

The insulating substrate 1 having the recording electrodes 2 formed on its surface are then partly covered with an insulating coating 3 in such a way that part of the electrodes will become exposed. This may be done by thermal compression bonding of a light-sensitive insulating film (dry film) on the electrodes and thereafter removing the unwanted areas of the film (i.e., where the electrodes are to come in contact with the recording medium) by a combination of photolithography and wet etching. Alternatively, an insulating film rather than the light-sensitive insulating film is bonded by thermal compression and after applying a resist film, the unwanted areas of the film are removed by a combination of photo-lithography and dry etching. The insulating coating preferably has a thickness in the range of 5 to 50 $\mu$m.

The shape of the exposed portion of the recording electrode where the recording electrode is not covered with the insulating coating may be suitably selected, in accordance with the shape of the desired recording head. That is, in the case where such a recording head as in the first embodiment is to be obtained, the exposed portion of the recording electrode is formed, as shown in FIG. 1. The exposed areas may have any desired shape and size so long as they will not come in contact with adjacent electrodes. On the other hand, in the case where projections 4 made of an electroconductive material are to be formed on the exposed areas of the recording electrodes, as in the second embodiment shown in FIGS. 2A to 2C, while the exposed areas may have any desired shape and size so long as they will not come in contact with adjacent electrodes, it is preferable that such exposed areas are rectangular or circular in shape and are of approximately the same size as the width of each electrode.

In the second embodiment, a projection 4 made of a conductive material is formed on the exposed area of each electrode. To this end, a conductive metal (e.g. Ni, Cr, Cu or the like) is deposited on the exposed areas by electrolytic plating to give a thickness greater than that of the insulation coating 3. It is preferable for the projections 4 to protrude above the insulation coating with an additional height in a range of 2.0 μm to 1 mm, preferably in a range of 7 to 30 μm. If the difference in height between the projections 4 and the insulation coating 3 is less than 2.0 μm, the effectiveness of the projections 4 will not be fully exhibited. If the difference exceeds 1 mm, the projections would be excessively high relative to the base surface of the substrate and may break when contacted by high spots such as dirt particles placed on the surface of the recording medium.

In order to ensure that the angle of contact between the head and the recording medium can be readily controlled, the projections 4 are preferably formed along the edge of the head.

In the second embodiment shown in FIGS. 2A through 2C, the projections 4 on the recording electrodes are arranged in a row parallel to the surface where the head is to make contact with the recording medium. Alternatively, the projections on adjacent electrodes may be staggered with respect to each other, or three or more projections may be arranged to assume a form resembling the teeth of a saw.

In the first and the second embodiments, grooves 8 can be formed between adjacent recording electrodes 2 by any suitable method such as cutting with a rotating wheel, laser beam working, dry etching, fluid cutting or the like. The grooves 8 may be provided through the elastic layer 6 to reach the substrate 7, or they may be cut halfway through the thickness of the elastic layer 6. Basically, the width of each groove 8 should be equal to that of the space between adjacent recording electrodes 2, but satisfactory results can be attained even if the width of the grooves is smaller than the gap between electrodes. Good results are also attained if the grooves extend inward from the front end of the head by a distance of 5 to 40 mm. However, these figures are given for illustrative purposes only and the longitudinal dimension of the grooves should be properly determined by the shape of the exposed areas of the recording electrodes.

The recording head of the present invention is described hereinafter with reference to a more specific example, which is by no means to be taken as limiting.

EXAMPLE

An elastic layer of silicone rubber (rubber hardness: 35) was formed to a thickness of 2 mm on an aluminum substrate by bonding with an adhesive agent.

A copper foil of 20 μm thick was bonded to a polyimide film of 25 μm thick by means of an adhesive agent. The copper layer was patterned by a combination of photolithographic and wet etching techniques to form recording electrodes in strips of 50 μm wide and spaced apart with a pitch of 125 μm.

A light-sensitive film of 20 μm thick was bonded to the recording electrodes by thermal compression, and a square window (50μm×50μm) was cut in the area near the front end of each electrode by photolithography so as to expose part of the recording electrode. A nickel projection was deposited on each recording electrode in the exposed area by electrolytic plating so as to protrude with an additional height of 15 μm. The so prepared insulation film was bonded to the separately prepared aluminum substrate carrying the elastic layer described above. Using a precision cutting wheel (blade thickness: 25 μm), grooves of 20 μm length were cut in the resulting assembly in areas between adjacent electrodes running from its front end parallel to the recording electrodes. These grooves were cut halfway into the elastic layer so as to leave intact a portion of this elastic layer having a height of 200 μm.

The so fabricated recording head was pressed against an aluminum drum having a diameter of 100 mm at a contact angle of 30° under various pressures while the drum was rotated at a linear speed of 120 mm/sec. Under these conditions, a conduction test was performed between the electrodes and the aluminum drum. After the current had been applied for one hour, the conduction probability was evaluated and the results are shown in the table below.

Figure 6:
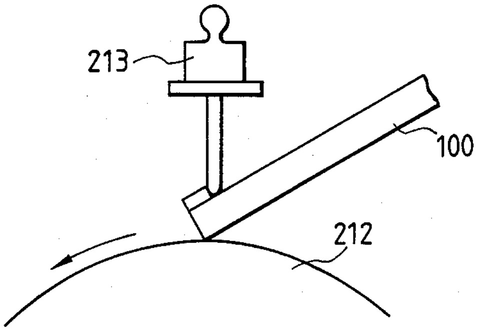
FIG. 6 shows the manner for evaluating the conduction probability of the recording head.

The manner for evaluating the conduction probability is as shown in FIG. 6. As shown in FIG. 6, the recording head 100 was contacted to the aluminum drum 212 under pressures applied by the pressure-generating weight 213. The contact pressure was changed to have various values.

As a comparison, a recording head of the same type as described above but with no grooves provided between adjacent electrodes was fabricated and subjected to the evaluation of conduction probability. The results are also shown in the following table.

TABLE

| | Conduction Probability (%) | |
|---|---|---|
| Pressure (g/mm$^2$) | Example | Comparative Example |
| 30 | 82 | 65 |
| 100 | 96 | 77 |
| 500 | 99 | 93 |

The above data shows that the recording head of the present invention has a current carrying capacity that is not greatly dependent upon the pressure at which it is pressed against a recording medium and that it ensures effective contact with the medium even if it is pressed against the latter with a low degree of pressure.

The recording head of the present invention has an elastic layer on a substrate, so that it is capable of preventing the poor quality of contact with a recording medium that may occur when recording electrodes separate from the surface of the recording medium on account of the asperities or waviness present o the surface of the recording medium.

In addition, this recording head has a groove provided between adjacent electrodes, so that it offers the following advantages:

(1) Individual electrodes are isolated from one another by the grooves, so that even if one electrode separates from the recording medium on account of dust or dirt particles or some other foreign matter, it will not affect any other electrodes.

(2) The recording head is capable of maintaining dynamic contact with the recording medium so that small vibrations will not propagate to the latter. Besides this, any tiny foreign matter introduced can be readily removed, by simply brushing or wiping it off to drop into the grooves.

(3) Because of the increased reliability of contact between each electrode and the recording medium, the pressure at which the head must be compressed against the medium can be reduced to such a level that not only can the wear-resistant characteristics of the recording medium be improved but also the reliability and service life of the stylus contact portions can be increased.

Furthermore, in the case where projections made of an electroconductive material are formed on the recording electrodes as in the second embodiment of the present invention, the area over which the head comes in contact with the recording medium is further reduced, and therefore, effective contact between the two members can be achieved with the application of an even lower degree of pressure. This contributes not only to a further increase in the service life of the recording head but also to an even further reduced degree of wear of the recording medium.

I claim:

1. A recording head, comprising an electrically insulating substrate having an elastic layer on a substrate; plurality of recording electrodes arranged in a side-by-side relationship on the elastic layer; and a groove provided between the adjacent recording electrodes at least in the area near the front end of the electrode.

2. A recording head of Claim 1, wherein the plurality of recording electrodes are covered with an insulation coating except in part of the area near the front end of each electrode.

3. A recording head of Claim 2, wherein a projection of an electroconductive material is formed in each of the areas of the recording electrodes that are not covered with the insulation coating.

4. A recording head of Claim 3, wherein the projection protrudes above the insulation coating with an additional height in a range of 2.0 $\mu$m to 1 mm.

5. A recording head of Claim 1, wherein the grooves are provided between all the recording electrodes adjacent to each other.

* * * * *